United States Patent [19]

Reilly

[11] 3,968,863

[45] July 13, 1976

[54] ENERGY ATTENUATOR

[75] Inventor: Mason J. Reilly, Media, Pa.

[73] Assignee: The Boeing Company, Seattle, Wash.

[22] Filed: Sept. 22, 1975

[21] Appl. No.: 615,279

[52] U.S. Cl. ............................. 188/1 C; 297/216
[51] Int. Cl.² ............................................ F16F 7/12
[58] Field of Search .............. 74/492, 493; 188/1 C; 280/150 SB; 297/216, 386

[56] References Cited
UNITED STATES PATENTS

| | | | |
|---|---|---|---|
| 2,933,127 | 4/1960 | Brewster | 297/216 |
| 3,087,584 | 4/1963 | Jackson et al. | 188/1 C |
| 3,195,685 | 7/1965 | Blackstone | 188/1 C |
| 3,372,773 | 3/1968 | Russo et al. | 188/1 C |
| 3,856,328 | 12/1974 | Koizumi | 280/150 SB |

*Primary Examiner*—Duane A. Reger
*Attorney, Agent, or Firm*—Joseph M. Corr

[57] ABSTRACT

An energy attenuator for use with tensile or compressive loads is disclosed. The attenuator has two housings slidably fitted within one another. Relative motion of the two housings is opposed by a wire bending mechanism comprising a stiff wire and a trolley which bends the wire as it moves along the wire. The force required to move the housings is determined by the mechanical properties and size of the wire used and the orientation of the bearing surfaces of the trolley.

5 Claims, 8 Drawing Figures

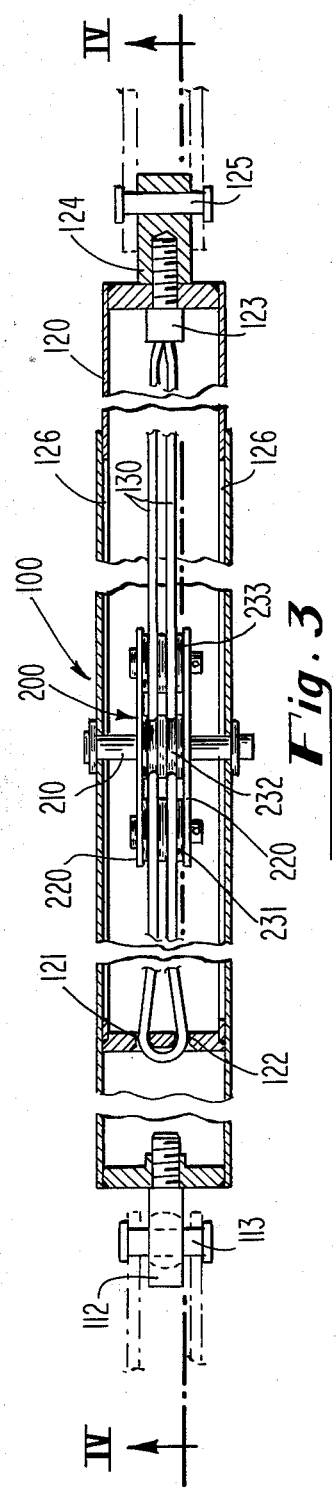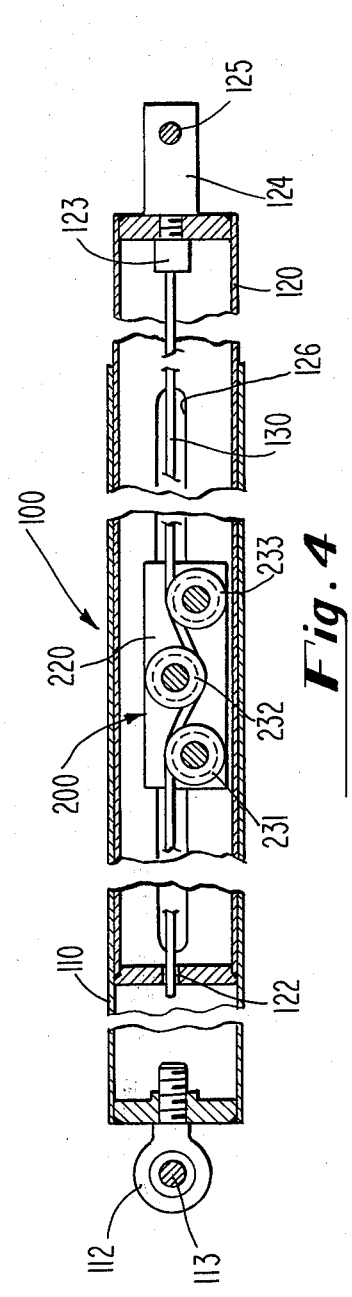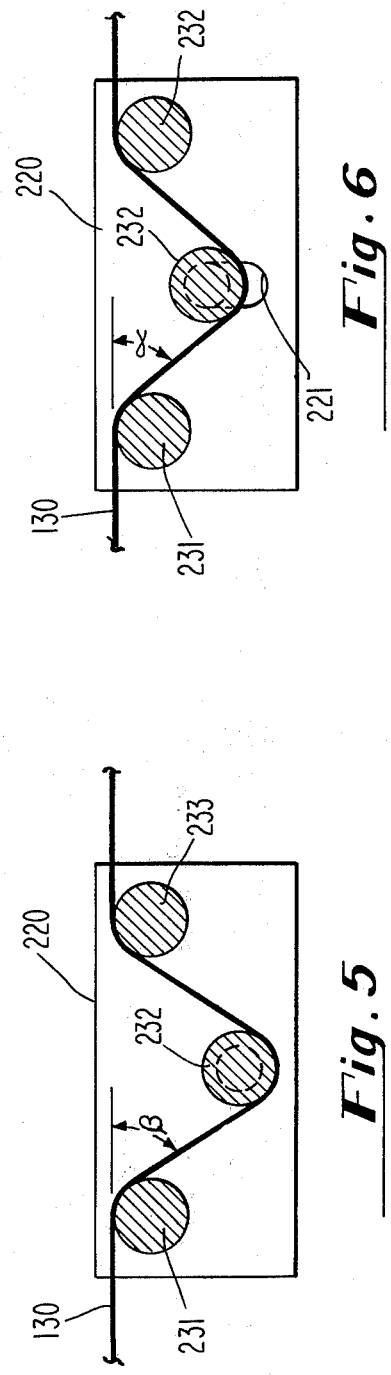

ENERGY ATTENUATOR

BACKGROUND OF THE INVENTION

This invention relates to energy absorbers, or attenuators, and in particular to energy attenuators which can be used to control the tensile or compressive forces within a structure.

It is frequently desirable to design a rigid structure in such a manner that when it is subjected to high tensile or compressive loads it fails gracefully. This "graceful degradation" feature is particularly applicable to situations where the structure comprises a conveyance, such as an automobile, railway car, or airplane, which may be subjected to high loads in the event of an accident. To be effective, these mechanisms must yield when specified forces are applied to them, and should be impervious to the evironment usually encountered in such conveyances—such as a high vibration level, weather, etc. In many situations, and particularly where a rebound force may be encountered, it is important that the attenuator be able to attenuate both tensile and compressive loads.

A variety of mechanisms have been employed as energy attenuators in the prior art. Some of these, such as the shear bolts employed in railway coupling mechanisms, are relatively inexpensive, and impervious to weather, and can be designed to yield at a design load, but they do not provide a continuous "stroking" force.

Those mechanisms which were designed to provide a stroking action, such as hydraulic shock absorbers; inertia reels, and even wire-bending attenuators, were usually expensive, and complicated. Further, the prior art attenuators were not dependable, and were particularly susceptible to the effects of weather, aging, and vibration. The prior art attenuators often did not stroke when the design load was applied, but instead yielded over a wide range of forces. This undesirably wide variation persisted in spite of tedious and expensive manufacturing methods. Most prior art attenuators were designed to respond to tensile or compressive loads, but not both.

SUMMARY OF THE INVENTION

The invention consists of a relatively rigid member which can be used as a structural member and which will stroke when exposed to predetermined tensile or compressive forces. The attenuator consists of two concentric housings mounted one within the other in such a manner that the housings can telescope axially in either direction Relative motion of the housings is opposed by a wire-bending mechanism contained within the inner housing. A wire contained within the cavity of the inner housing is fixedly attached to both ends of the inner housing. A wire-bending trolley surrounds this wire and is rigidly attached to the outer housing. Longitudinal slots in the inner housing allow for the relative motion between the two housings, while accommodating the rigid attachment of the wire-bending trolley to the outer housing.

Accordingly, it is a primary object of this invention to provide a load limiting attenuator which is economically and easily fabricated, and which can be designed to stroke when tensile or compressive loads above a specific limit are applied.

It is another object of this invention to provide an attenuator which is capable of attenuating both tensile and compressive loads.

It is another object of this invention to provide an attenuator which is relatively impervious to the effects of continued vibration.

It is another object of this invention to provide an attenuator which is relatively immune to the effects of weather.

It is another object of this invention to provide an energy attenuator which is readily suited to mass production methods.

These and other objects of this invention will become apparent from an inspection of the following specification taken together with the drawings.

BRIEF DESCRIPTION OF THE DRAWINGS

FIG. 3 is a cross-sectional view of the wire-bending energy attenuator showing a top view of the wire-bending trolley.

FIG. 4 is a cross-sectional view of the wire-bending energy attenuator illustrating a side view of the wire-bending trolley.

FIG. 5 is an exaggerated schematic illustration of the orientation of the bearing surfaces of the wire-bending trolley.

FIG. 6 is an exaggerated schematic illustration of the orientation of the bearing surfaces of the wire-bending trolley.

DESCRIPTION OF THE PREFERRED EMBODIMENT

The purpose of this invention is to provide an energy attenuator which can be used as a structural member under ordinary load situations, but which will stroke at a predicted load.

Figure 1:
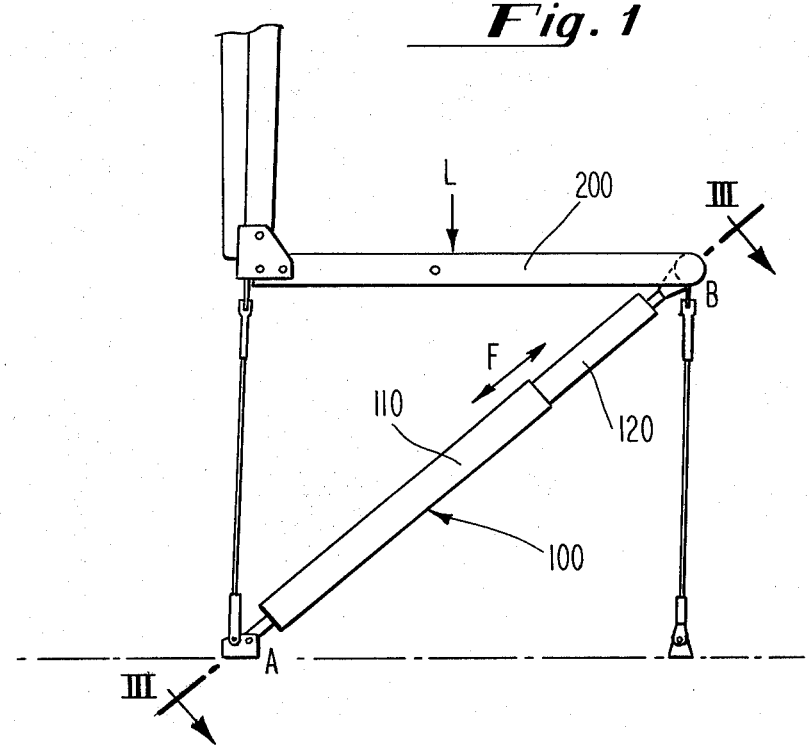
FIG. 1 schematically illustrates the installation of an energy attenuator in a passenger seat structure.
Figure 2:
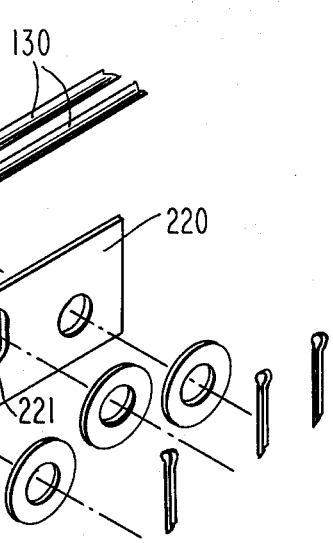
FIG. 2 is an exploded view of the wire-bending trolley and wire.

An example of the installation of such an energy attenuator in a structure is shown in FIG. 1. As illustrated, the structure consists of a portion of a troop seat, but it will be appreciated that there are many other applications for such an energy attenuator. Examples of other applications include railway car coupler crash load attenuators; automobile bumper crash attenuators; etc. This invention is adaptable to use over a wide latitude of design load limits, and can be used in any application where it is desirable to gradually degrade a structure when exposed to high loads. The fact that this novel attenuator responds to both tensile and compressive loads makes it particularly suited to applications where a "rebound" force could be encountered.

As illustrated in FIG. 1, the energy attenuator assembly 100 normally forms a rigid portion of the seat structure. Energy attenuator 100 is fixedly secured to the seat structure at points A and B as shown. Under normal conditions, the base of the seat 200 supports the weight of the person occupying the seat. This in turn imparts a load to the energy attenuator 100. The energy attenuator is designed to remain rigid under this loading condition. In the event that a high transient load is applied to the seat, such as during a crash landing when the accelerative forces would greatly increase the effective force (L) applied to the seat, the attenuator is designed to telescope axially along line F. This axial displacement is known as "stroking".

The stroking characteristics of this energy attenuator will be discussed in more detail below. It should be understood that the purpose of this stroking action is to filter out high peak transient loads by effectively spreading them out over a longer time duration. Stroking occurs in reaction to both tensile and compressive loads.

The construction of the novel energy attenuator disclosed in this invention can best be understood by examination of FIGS. 3 and 4. As shown in FIG. 3, housings 110 and 120 are slidably fitted within each other so that the two housings can telescope axially when a load is applied.

A wire 130 is fixedly attached to each end of inner housing 120. Thus, the wire 130 is suspended within the inner cavity of inner housing 120. As illustrated in FIG. 3, one manner of attaching the wire is to shape it into a U shape, much like a hairpin, and insert it through one end of inner housing 120 through apertures 121 and 122. The opposite ends of wire 130 are then securely attached to stud 123 at the opposite end of the housing 120 as illustrated. It will be appreciated that there are many alternative possibilities for securing the wire 130 within housing 120, such as by welding, tying, etc.

The wire-bending assembly 200 engages the wire 130 as shown in FIGS. 3 and 4. Trolley assembly 200, consists of two side plates 220, and three rollers, 231, 232, and 233 sandwiched between said side plates 220. Wire 130 is guided around the rollers 231, 232, and 233 as illustrated in such a manner that as the wire-bending trolley moves along the wire, it bends the wire. The wire-bending trolley assembly 200 is fixedly attached to the outer housing assembly 110 by pin 210. Pin 210 extends through longitudinal slots in inner housing assembly 120. These longitudinal slots, not illustrated, extend for a sufficient distance to allow the inner and outer housings to telescope through their design stroke length.

As inner housing 120 and outer housing 110 telescope with regard to one another, the wire-bending trolley assembly 200 bends the wire 130, thereby expending energy. The amount of force required to cause the two housings to begin to telescope with regard to one another is a design consideration which can be influenced by several factors. The size and material of wire 130 of course can be varied for various load requirements. The number of lengths of wire suspended within the inner housing, and, of course, the number of rollers engaging the wire can also be varied. Further, the orientation of the rollers used to bend the wire can be altered to achieve the desired stroking load. This last variation is particularly suited to fine-tuning the attenuator to achieve a desired design load.

FIGS. 5 and 6 illustrate different orientation of rollers 231, 232, and 233 of wire-bending trolley assembly 200. In FIG. 5, wire 130 is bent through angle Beta, as illustrated, as it passes around rollers 231 and 232. In FIG. 6, wire 130 is bent through angle Alpha, which is smaller than angle Beta, as it passes around rollers 231 and 232. Since the wire 130 is bent through a lesser angle in FIG. 6 than in FIG. 5 the amount of energy expended as the trolley moves along wire 130 in the example given in FIG. 6 will be less than that for the example given in FIG. 5.

The fact that it is relatively easy to alter the stroking force provided by the energy attenuator by varying the orientation of the axes of the rollers of the wire-bending trolley assembly, as described above is an important and novel feature of this invention. In many situations, it will be desirable to provide an energy attenuator that strokes precisely at a specific load. The selection of the wire 130 to be used in the energy attenuator will determine the overall range of possible stroking loads to be attenuated. Having made these design choices, a prototype can be manufactured with the rollers oriented, as shown in FIG. 5, in such a manner that the wire is bent at a large angle, and therefore a larger than desired attenuating force is obtained. By trial and error, it is then possible to gradually elongate the slot inside plates 220 through which retaining pin 210 is inserted in such a manner that roller 232 moves in relation to the other rollers. When the desired stroking force for the energy attenuator is obtained, the proper orientation of rollers 231, 232, and 233 has been determined. It is then possible to manufacture, quite inexpensively, any desired quantity of energy attenuators which will provide this stroking force, without the necessity for measuring individually each attenuator as it is produced, as was required by the prior art.

Figure 7:
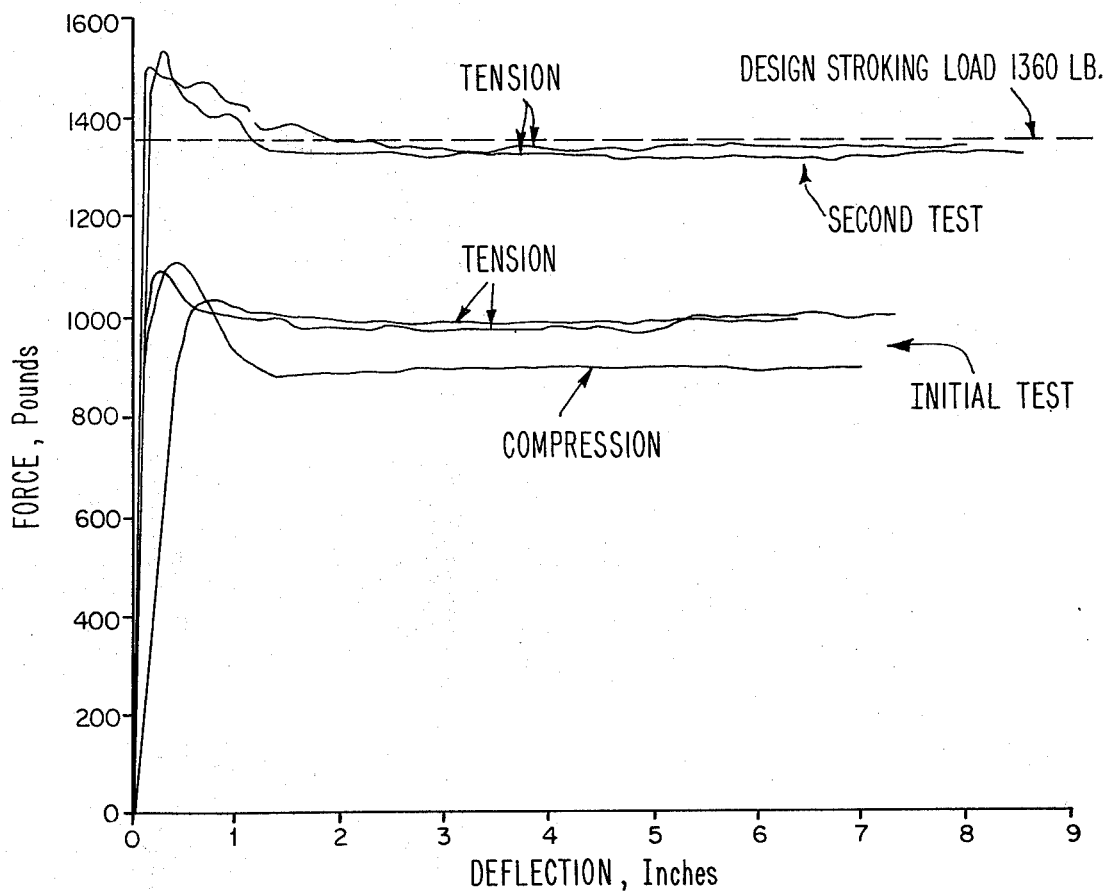
FIG. 7 illustrates the Force/Deflection characteristics of the wire-bending attenuator taught in this disclosure.

FIG. 7 illustrates the Force/Deflection characteristics of this novel wire-bending attenuator. The three plots labeled *initial test* show that the energy attenuator provides a very constant stroking force over a considerable deflection. Note that the force resulting from a tensile load is very repetitive while the compressive force reaction, though somewhat less, is also quite constant.

The plots labeled *second test* in FIG. 7 represent the results obtained from the same attenuator after the orientation of the roller axis had been altered to provide more bend to the wire. These plots, both of which represent the reaction to a tensile load, show that the energy attenuator can be designed to provide a very precise stroking force and that it is possible to fine-tune the attenuator to the desired stroking force.

Figure 8:
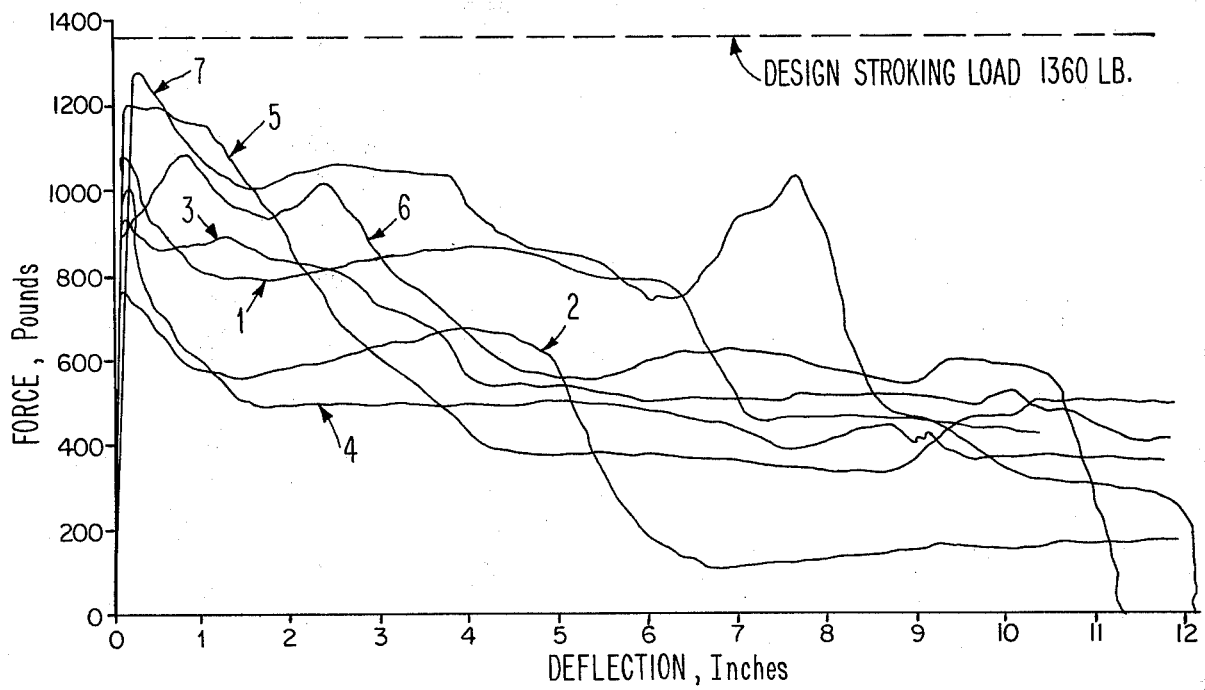
FIG. 8 gives the Force/Deflection characteristics of a prior art attenuator.

FIG. 8 is a representative plot of the Force/Deflection characteristics of a prior art attenuator. This figure represents actual data taken for an aluminum strut attenuator with a stainless steel torus wire. The plots labeled 1–7 on FIG. 8 represent the results of testing seven similar attenuators, which were intended to stroke at 1360 pounds. As can be seen by the variance of the yield point of the attenuator and the erratic Force/Deflecton characteristics of the devices, none of them were satisfactory. This data is presented by way of example to illustrate the significant improvement afforded by this new and novel attenuator disclosed herein.

Having fully described my invention, what is claimed is:

1. An energy attenuator comprising:
   an outer housing defining a cavity, said outer housing having a first end adapted for mounting to a structure and a second end open for insertion of an inner housing;
   an inner housing defining a cavity, said inner housing having a first end adapted for mounting to a structure and a second end slidably inserted into the cavity of the outer housing, said inner housing having a longitudinal slot to allow communication from the cavity of the inner housing to the wall of the outer housing;

a wire extending longitudinally through the cavity of the inner housing; fixedly attached to the first and second ends of said inner housing;

wire bending means within the cavity of the inner housing operatively engaging the wire;

connecting means fixedly attaching the wire bending means to the outer housing, said connecting means passing through the longitudinal slot in the inner housing whereby, as the inner and outer housings move in relation to each other in response to tensile or compressive forces applied to the mounting ends of the housings, energy is expended in bending the wire.

2. A device in accordance with claim 1 wherein the wire bending means comprises:

two side plates disposed on opposite sides of the wire;

at least two bearing surfaces extending perpendicularly to the side plates, fixedly attached to the side plates, said bearing surfaces engaging the wire in such a manner that the wire is bent as it passes over the bearing surfaces guided by the side plates.

3. The device in accordance with claim 2 wherein the bearing surfaces are rods.

4. The device in accordance with claim 1 wherein the wire bending means comprises:

two side plates disposed on opposite sides of the wire;

two axles fixedly joining the two side plates;

a roller upon each axle operatively engaging the wire in such a manner that the wire is bent as it passes over the roller guided by the side plates.

5. The device in accordance with claim 1 wherein the inner and outer housings are tubular.

* * * * *